A. N. MONTEER,

Assignor of one-half interest to D. F. VAN LIEW.

Door-Hanger.

No. 9,174. Reissued April 27, 1880.

Attest:
A. Barthel
Charles J. Hunt.

Inventor:
A. N. Monteer
By Atty
Phil. S. Gosque

UNITED STATES PATENT OFFICE.

ALEXANDER N. MONTEER, OF KANSAS CITY, MISSOURI, ASSIGNOR OF ONE-HALF INTEREST TO DENNIS F. VAN LIEW.

DOOR-HANGER.

SPECIFICATION forming part of Reissued Letters Patent No. 9,174, dated April 27, 1880.

Original No. 223,941, dated January 27, 1880. Application for reissue filed March 12, 1880.

*To all whom it may concern:*

Be it known that I, ALEXANDER N. MONTEER, of Kansas City, Jackson county, Missouri, have invented an Improvement in Door-Hangings, of which the following is a specification.

The nature of this invention relates to certain new and useful improvements in devices particularly designed for hanging and carrying car-doors.

The invention consists in the peculiar construction, arrangement, and combination of the various parts, all as more fully hereinafter set forth.

Figure 1:
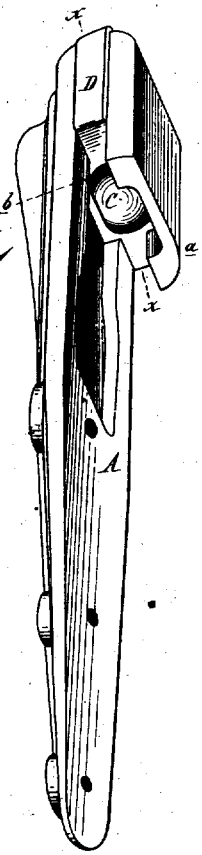
Figure 2:
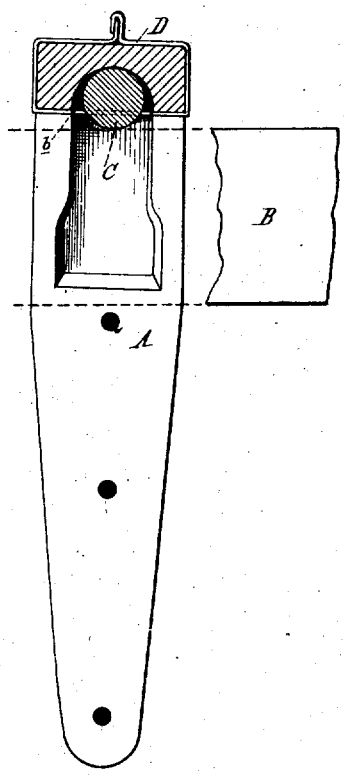
Figure 3:
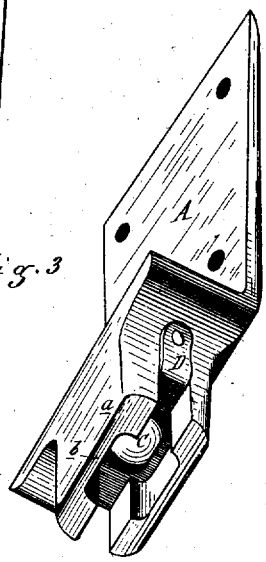
Figure 4:
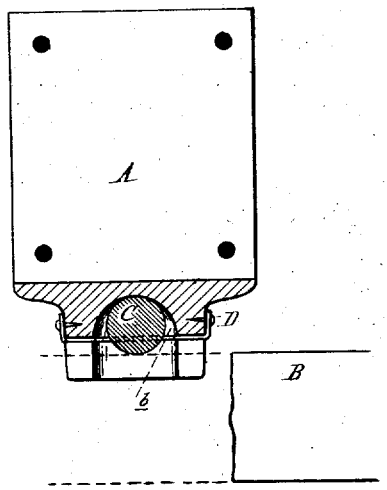

In the drawings, Figure 1 is a perspective view of my improved hanger. Fig. 2 is a section on line *x x*. Fig. 3 is a perspective view of a modification of my door-hanger to be secured to the lower edge of door. Fig. 4 is a sectional view of the same.

In the accompanying drawings, which form a part of this specification, A represents a metallic hanger, which is secured to the upper edge of a car-door so that its flange *a* will embrace the bar B, secured to the side of the car, as in the ordinary manner. Within the head of this hanger I form a chilled recess, *b*, within which I place a metal case-hardened ball, C, the same being held in place by means of the band D, through the hole in which the ball protrudes, as shown, the ends of the band being secured in any convenient manner.

In Figs. 3 and 4 of the drawings, which are views of the modified form of my door-hanger, A represents the part to be secured to the lower edge of the door; *a a*, the flanges in which the downward-projecting portion of the hanger terminates, which, when in place, embraces the bar B, secured to the side of the car, and thus prevents lateral motion; *b*, the recess which receives the ball C, which travels upon the upper edge of the rail B, and is supplied with a retaining-strap, as above specified.

By this manner of hanging a car-door, as the door is moved backward or forward, the weight is supported upon the ball C, which tends to neutralize the friction, and as it is loose in the recess it revolves in all directions, and consequently wears equally on all sides.

Should the hangings become loose the balls are retained by the straps or bands, and cannot fall out.

What I claim as my invention is—

1. In a door-hanger, and in combination with the rail B, the metallic hanger A, having a flange or flanges, *a*, and recess *b*, to receive the ball C, substantially as specified.

2. In a door-hanger, the combination, with the ball C, of the strap D, for retaining the ball in place, substantially as described and shown.

ALEXANDER N. MONTEER.

Witnesses:

H. H. BIDWELL,

R. MACSEVERN.